(12) United States Patent
Tropp

(10) Patent No.: US 10,641,012 B2
(45) Date of Patent: *May 5, 2020

(54) METHOD OF IMPROVING AIRLINE LUGGAGE INSPECTION

(71) Applicant: David Tropp, Brooklyn, NY (US)

(72) Inventor: David Tropp, Brooklyn, NY (US)

(*) Notice: Subject to any disclaimer, the term of this patent is extended or adjusted under 35 U.S.C. 154(b) by 333 days.

This patent is subject to a terminal disclaimer.

(21) Appl. No.: 15/855,721

(22) Filed: Dec. 27, 2017

(65) Prior Publication Data

US 2018/0142502 A1 May 24, 2018

Related U.S. Application Data

(63) Continuation of application No. 13/744,261, filed on Jan. 17, 2013, now Pat. No. 9,879,447, which is a
(Continued)

(51) Int. Cl.
*G06Q 10/10* (2012.01)
*G06Q 10/08* (2012.01)
(Continued)

(52) U.S. Cl.
CPC .......... *E05B 67/00* (2013.01); *E05B 35/105* (2013.01); *E05B 37/0034* (2013.01); *G06Q 30/0241* (2013.01); *G06Q 50/265* (2013.01); *G06Q 99/00* (2013.01); *Y10T 70/413* (2015.04); *Y10T 70/415* (2015.04); *Y10T 70/417* (2015.04); *Y10T 70/424* (2015.04); *Y10T 70/7141* (2015.04); *Y10T 70/7147* (2015.04); *Y10T 292/491* (2015.04)

(58) Field of Classification Search
CPC .. G06Q 30/0241; G06Q 50/265; G06Q 99/00; E05B 67/00; E05B 35/105; E05B 37/0034; Y10T 70/413; Y10T 70/7141; Y10T 70/7147; Y10T 70/417; Y10T 70/415; Y10T 70/424; Y10T 292/491
USPC .................................................. 705/1.1–912
See application file for complete search history.

(56) References Cited

U.S. PATENT DOCUMENTS 8,091,391 B2* 1/2012 Yu ........................ E05B 35/105
70/21
2005/0039501 A1 2/2005 Yu

OTHER PUBLICATIONS www.travelsentry.com, citations from between Jul. 2003-Oct. 2003. (Year: 2003).*

(Continued)

*Primary Examiner* — Jonathan P Ouellette
(74) *Attorney, Agent, or Firm* — Cooper & Dunham LLP

(57) ABSTRACT

Method of making airline luggage inspection secure while accommodating the needs of the traveler comprises making a special lock available to airline travelers, the special lock having a combination lock portion and a master key lock, the master key lock portion receiving a master key that can open the master key lock portion of any special lock of this type. The special lock is designed to be applied to an individual piece of airline luggage and has indicia conveying to luggage purchasers that the special lock is "approved" by a luggage screening authority and conveying to the luggage screening authority that the special lock can be opened using the master key. The method includes providing the luggage screening authority directly or indirectly with exclusive access to the master key. The manufacturers and/or providers of the master key and special lock retain copies of the master key.

31 Claims, 2 Drawing Sheets

Related U.S. Application Data continuation of application No. 13/412,233, filed on Mar. 5, 2012, now Pat. No. 10,597,905, which is a continuation of application No. 10/756,531, filed on Jan. 12, 2004, now Pat. No. 8,145,576, which is a continuation of application No. 10/706,500, filed on Nov. 12, 2003, now Pat. No. 7,021,537.

(51) Int. Cl.
| | |
|---|---|
| *G06Q 30/02* | (2012.01) |
| *G06Q 40/08* | (2012.01) |
| *E05B 67/00* | (2006.01) |
| *E05B 35/10* | (2006.01) |
| *E05B 37/00* | (2006.01) |
| *G06Q 50/26* | (2012.01) |
| *G06Q 99/00* | (2006.01) |

(56) References Cited

OTHER PUBLICATIONS

Business Wire—Safe Skies,LLC Aug. 8, 2019 Safe Skies and Conair Corporation Enter Licensing Agreement bringing TSA Recognized Luggage Locks to More Consumers. https://www.businesswire.com/news/home/20190808005949/en/Safe-Skies-Conair-Corporation-Enter-Licensing-Agreement.

* cited by examiner

METHOD OF IMPROVING AIRLINE LUGGAGE INSPECTION

CROSS-REFERENCE TO PRIOR APPLICATIONS

This application is a continuation of U.S. Ser. No. 13/744,261, filed on Jan. 17, 2013, issued as U.S. Pat. No. 9,879,447 on Jan. 30, 2018, which is a continuation of U.S. Ser. No. 12/412,233 filed on Mar. 5, 2013, which is a continuation of U.S. Ser. No. 10/756,531, filed Jan. 12, 2014, issued as U.S. Pat. No. 6,145,576 on Mar. 27, 2012, which is a continuation of U.S. Ser. No. 10/706,500, filed on Nov. 12, 2003, issued as U.S. Pat. No. 7,021,537 on Apr. 4, 2006. All applications and patents are hereby incorporated by reference herein in their entireties.

FIELD OF THE INVENTION

The field of this invention is methods of improving airline luggage inspection, and more particularly, methods of making such inspection less intrusive and more secure.

BACKGROUND OF THE INVENTION AND DISCUSSION OF THE PRIOR ART

Due to the threat of terrorism, in the weeks prior to Jan. 1, 2003, the Transportation Security Administration ("TSA"), a division of the United States Department of Homeland Security, announced that with respect to luggage at United States airports if a TSA baggage screener was unable to open a traveler's bag for inspection because the bag was locked, the screener would have to break the locks on the traveler's bag. Hence, passengers should leave their bags unlocked, according to the TSA. Beginning Jan. 1, 2003 the TSA's federal workers started screening luggage at U.S. airports and when it deemed it necessary it started clipping locks on this luggage in order to open and inspect the luggage.

Since by definition airport luggage screening occurs outside the presence of the passengers whose luggage is being inspected, it is impossible or at least impractical for airport luggage screening personnel to make use of combinations to open combination locks on airport luggage. Nonetheless, passengers may desire to use combination locks to avoid worrying about loss of a key or finding the key.

Although arguably necessary for security, the method of screening luggage that includes opening the passenger's luggage in a manner that leaves the luggage "unlockable" after the inspection process, for example by clipping the heretofore workable lock, suffers from several drawbacks. First, the passenger's belongings have been damaged either because the lock has been clipped or because the luggage has been opened forcibly or both. This causes monetary damage. it also causes aggravation. Second, a new security hazard is generated since the passenger gets back a piece of luggage with a broken or removed lock. This means that during the remainder of the passenger's trip his or her luggage is not secure and can be tampered with. The remainder of the trip may even include further domestic flights. Furthermore, if travelers consistently have their locks broken, travelers will see no value in using locks when traveling, thereby exposing their unlocked luggage to a constant risk of tampering.

One should not assume that security risks exist only among passengers. Terrorists have tried in the past and may try in the future to compromise the workers at the airports who inspect luggage. Accordingly, the no longer secure piece of luggage is subject to the risk that a terrorist or other dangerous person who is within the area of the airport luggage screening personnel—because he is a worker or because he penetrated the secure area—can insert a bomb or other hazardous material into the luggage by easily opening it since it not only does not have a lock anymore but its outward appearance, i.e. a damaged lock, may advertise that it has been tampered with and be easily opened.

Furthermore, the sale of padlocks plummeted after the TSA began the practice of clipping locks. Another thing that happened was that the number of claims for theft and damage allegedly caused by the government and/or airline personnel to passengers' luggage increased significantly since Jan. 1, 2003.

Another problem is that passengers are concerned about theft of the contents of their bags without the protection of locks (after their locks have been rendered useless by the luggage screening authorities)

Travelers understand and support the federal government's initiatives to thwart terrorism. This support of security regulations and procedures on the part of travelers is critical to their implementation and success. However, travelers, just getting accustomed to the new security laws, may have legitimate concerns about baggage inspections. It is crucial that the government or appropriate authorities act to diminish travelers' concerns in this regard.

In addition, working as a TSA luggage screener is a highly demanding and stressful job. Therefore, anything that reduces the physical strain would be highly appreciated by the screeners.

It should be born in mind that the number of airline travelers who pass through airports in the United States in a given year is close to half a billion. Thus, these concerns affect a great many individuals.

Accordingly, there is a compelling and immediate need for a method of inspecting luggage at airports that does not create a security risk and that is not damaging or aggravating to the passengers.

SUMMARY OF THE PRESENT INVENTION

The present invention presents a method of making airline luggage inspection secure while accommodating the needs of the traveler includes a first step of making a special lock available to airline travelers, the special lock having a combination lock portion and a master key lock, the master key lock portion for receiving a master key that can open the master key lock portion of any special lock of this type. The special lock is designed to be applied to an individual piece of airline luggage and has an indicia thereon conveying to luggage purchasers that the special lock is "approved" by a luggage screening authority and conveying to the luggage screening authority that the special lock can be opened using the master key. Then providing the luggage screening authority with exclusive access to the master key. The manufacturers and/or providers of the master key and special lock retain copies of the master key. In accordance with the method of the present invention, therefore, the luggage screening authority need not clip or otherwise break open locks to inspect luggage, nor do they have to break into the luggage in some other manner. The workers need only be told that master keys are available to open locks that have the indicia on them.

IMPORTANT OBJECTS AND ADVANTAGES

The following important objects and advantages of the present invention are:

(1) to provide a method of screening luggage at airports that avoids forcible opening of the luggage;

(2) to provide a method of screening luggage at airports that employs special locks that remain viable after being subjected to airport luggage screening and inspection;

(3) to provide a method of non-intrusively searching passenger's luggage at airports;

(4) to provide a method of screening luggage that uses a master key exclusively maintained by the luggage screening authority;

(5) to provide a method of improving luggage screening at airports that avoids the need for clipping the locks on passenger luggage;

(6) to provide a method of screening luggage at airports that eliminates a potential security threat of tampering with broken-into luggage or luggage whose locks have been broken;

(7) to provide a method of luggage screening that reduces the costs of the luggage screening authority;

(8) to provide a method of luggage screening that eliminates the need for lock clippers;

(9) to provide a luggage screening method that reduces injuries to luggage screeners that may arise from clipping locks;

(10) to provide an improved method of luggage screening at airports that requires essentially no new training;

(11) to provide a method of airport luggage screening that reduces the liability to the luggage screening authority;

(12) to provide an improved method of luggage screening that would not interfere with current policy of the luggage screening authority in that luggage locks could still be clipped if they did not display the indicia conveying that were "TSA approved" or authorized;

(13) to provide a luggage screening method that decreases the labor of luggage screeners in that opening the special lock of the method of the present invention requires less manual labor than breaking locks;

(14) to provide a method of luggage screening that provides a public relations benefit to the TSA or luggage screening authority in that travelers will appreciate the TSA or luggage screening authority's concern for their personal property, an important benefit for new agency;

(15) to provide a method of airport luggage screening that allows the luggage screening authority to get its work done more efficiently;

(16) to provide a method of airport luggage screening that allows a thorough search of the passenger's luggage while at the same time providing a less intrusive and more comfortable search to the passenger;

(17) to provide a method of screening luggage at airports that eliminates the danger of tampering with luggage that has been broken into subsequent to the screening process; and

(18) to provide a method that eliminates the need to break into the luggage at a point other than its lock.

DETAILED DESCRIPTION OF THE PREFERRED EMBODIMENT

Figure 1:
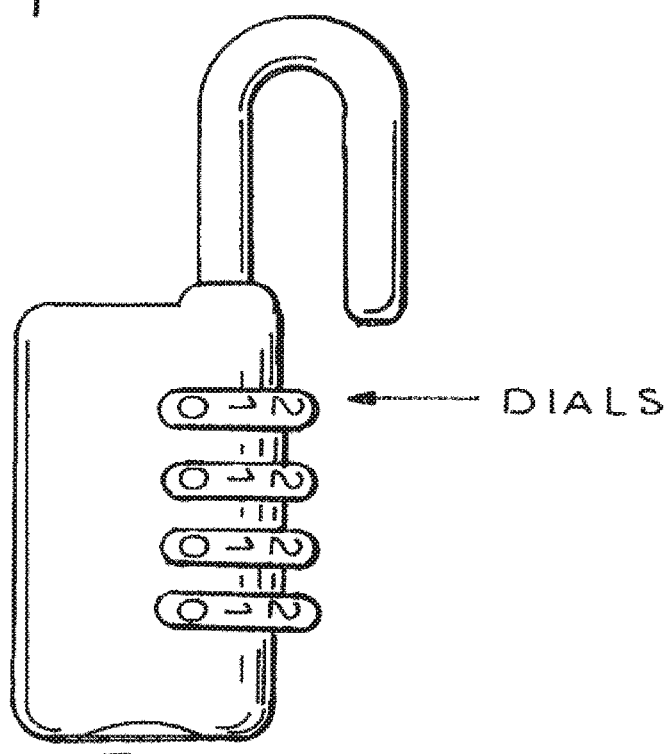
FIG. 1 is a front plan view of one embodiment of the special lock used in the method of the present invention in open position modified to show a key hole for a master key on the bottom.

The method of the present invention includes the step of making a special lock available to airline travelers, the special lock having a combination lock portion and having a master key lock, the master key lock portion for receiving a master key that can open the master key lock portion of any special lock of this type, the special lock designed to be applied to an individual piece of airline luggage. The special lock also has indicia thereon conveying to luggage purchasers and to the luggage screening authority that the special lock is a lock that the luggage screening authority has agreed not to break. The indicia can state, for example, that the special lock is "approved", "accepted" or "authorized" by the luggage screening authority. The term "indicia" is a broad term and can include the special lock having a distinctive physical characteristic such shape, texture; weight and/or other characteristic that makes it instantly recognizable by individuals working for the luggage screening authority who are specifically for that characteristic. Alternatively, a distinctive chemical or electronic characteristic can be used—in short any distinctive characteristic that can be instantly recognized by persons looking for it.

The phrase "any special lock of this type" is intended to include special locks having a multiplicity of sub-types such as different sizes, different manufacturing designs or styles, etc.

Besides making the special lock more valuable to prospective luggage purchasers or lock purchasers, such indicia also tells the luggage screening authority that the special lock can be opened by the luggage screening authority using the master key and that the special lock is among those locks that the luggage screening authority agrees not to break in order to inspect the luggage. The phrase "approved", "accepted" or "authorized" is a broad phrase intended to include other words or terms that signify that the luggage screening authority agrees that locks having such indicia will not be broken into.

The method of the present invention also includes the step of providing the luggage screening authority, directly or indirectly, with access to the master key. This step includes providing such access with the help of or in conjunction with another business entity, i.e. a third party. The access is to be exclusive except that one or more of the following entities may retain copies of the master key: the manufacturer of the special lock, since it may need to retool the special lock, the provider to the passengers of the special lock, which may or may not be the same as the manufacturers, the manufacturer and/or the provider of the master key to the luggage screening authority. It is anticipated that the manufacturer of the special lock will also provide the master key but other possibilities are also contemplated by the present invention.

The step of providing access may be accomplished by delivering one or more master keys to the luggage screening authority or by delivering one or master keys to a company or organization whose responsibility it is to cause said one or more master keys to be delivered to the luggage screening authority.

Access to the master key by the luggage screening authority includes having access to any appropriate number of such master keys by its workers or by any appropriate division of part of said luggage screening authority.

Although the present invention is a method of improving the inspection of airline luggage, the method of the present invention makes use of an apparatus. This apparatus is a special lock. The special lock is illustrated by reference to the accompanying drawings. Consequently, the special lock used in the method of the present invention has been assigned reference numeral 10 Other elements have been assigned the reference numerals referred to below.

Combination locks have certain advantages over locks with keys. For one thing, there is no need to fear loss of the key. Hence, it is advantageous to have combination locks on luggage used to fly with since flights tend to cause stress and stress can lead to loss of the key. Second, even if one has the key it takes time to retrieve it. If the luggage has to be opened suddenly then retrieval of the key is an inconvenience. Although combination locks require memorization of access to the coded combination, this is usually considered better than a key lock on balance to many passengers. Hence, there is a need for a method of improving luggage screening at airports that makes of a special lock that includes a unique combination but that is nonetheless convenient and secure for the passengers and for the airport luggage screening personnel.

As seen from FIGS. 1-4, special lock 10 includes a combination lock portion 20 having a unique combination and a master key lock. The master key lock portion is opened by a master key that is inserted in key hole 30. Typically, although not necessarily, the key hole would be inconspicuously placed on the bottom of the special lock 10. The combination lock portion can be any kind of combination lock portion suitable for use with a piece of luggage at an airport. The combination can be a front dial that is turned or several dials that are turned to set the combination.

Presently, the Transportation Security Administration, a division of the United States Department of Homeland Security has the task of screening travelers' luggage at airports. However, the term "luggage screening authority" is intended broadly to encompass both the Transportation Security Administration and any governmental entity or non-governmental organization whose task includes screening the luggage of travelers at airports in the United States or a non-governmental organization. Alternatively, the luggage screening authority can be a governmental entity or non-governmental organization whose task includes screening the luggage of travelers at airports in Canada or another country. Furthermore, the luggage screening authority is also intended to broadly include individual workers who screen luggage at airports and other personnel of the TSA or of some other entity or organization whose task it is to screen such luggage.

Thus, the master key allows the authorized agency's workers to have the ability to open any of the luggage that the workers inspect in a manner without clipping the lock. The indicia notifies the luggage screening authority which pieces of luggage has locks that lock the master key opens and it notifying purchasers of the special lock of an added value of the special lock. Market research exists to support the fact that customers will spend significantly more on luggage if they know that it comes with a lock that the luggage screening authorities such as the TSA recognize as being openable by their master key and without forcibly opening the luggage.

Figure 2:
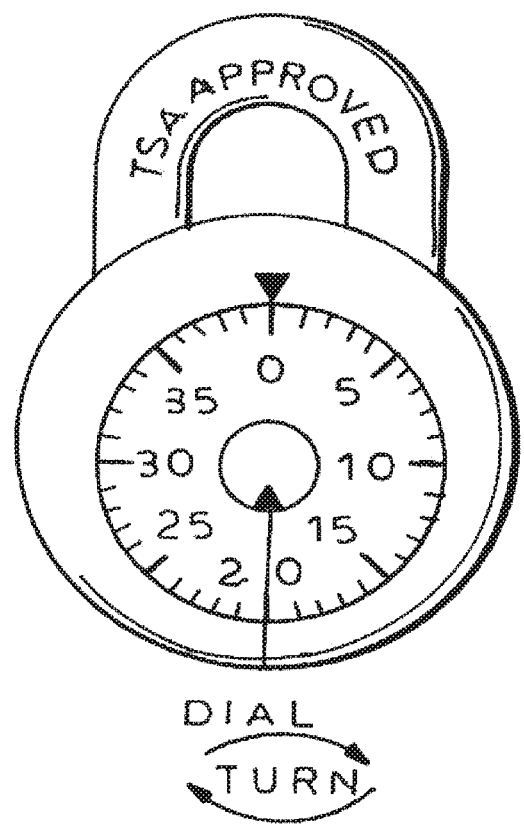
FIG. 2 is a front plan view of a second embodiment of the special lock used in the method of the present invention.
Figure 3:
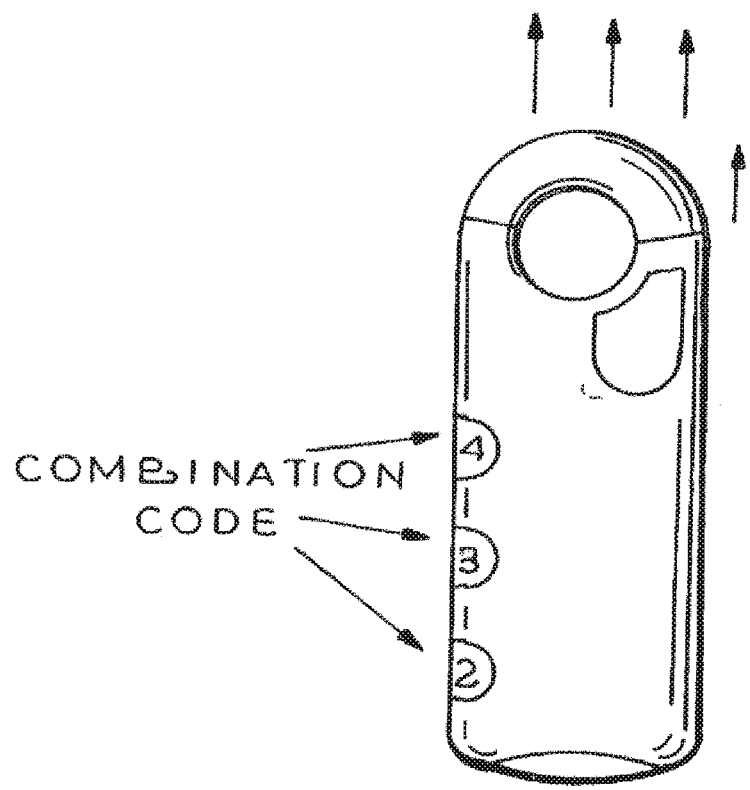
FIG. 3 is a front plan view of a second embodiment of the special lock used in the method of the present invention modified to show a key hole for a master key on the bottom.
Figure 4:
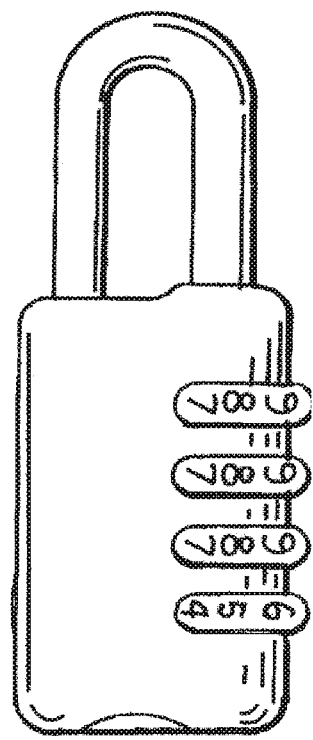
FIG. 4 shows the special lock depicted in FIG. 1 in closed position.

As seen in FIG. 2, the indicia 50 can take the form of a phrase "approved by the TSA" or any similar phrase or it can be anything else that conveys the approval, authority, acceptance etc. by the TSA or other relevant luggage screening authority. It should be understood that although one example of the indicia appears in FIG. 2 only, the other embodiments of the special lock used in the method of the present invention would also have the indicia.

It should be noted that with the use of the special lock by the traveler, the traveler still selects a combination for the combination lock portion of the special lock 10 and the traveler has that combination for the combination lock portion part of the special lock. Accordingly, the traveler still has a useful secure lock after passing airport security. In addition, the luggage screening authority still maintains an effective and quick way of accessing airport luggage for inspection whenever it deems doing so necessary.

It should be noted that the terms "master key" and "master key lock portion" are broad terms intended to also include electronic or other sensor mechanisms for opening up the master key lock portion in special lock 10. Thus, the method of the present invention contemplates using in certain embodiments a special lock 10 that makes use of an electronic sensor instead of a traditional physical key even though such a traditional physical key is what is typically understood by the term "master key". In such a case the locking mechanism inside special lock 10 would not be a traditional master key lock mechanism but rather would be a locking mechanism that is opened by an electronic sensor.

The present invention also contemplates that in certain embodiments other lock mechanisms besides a traditional combination lock can be used as one of the locks in special lock 10. Hence, in an alternative embodiment, the method would employ a first lock portion instead of a combination lock portion in special lock 10. The first lock portion can be any kind of locking mechanism useful for and easily accessible by the passenger.

It is to be understood that while the method of this invention have been described and illustrated in detail, the above-described embodiments are simply illustrative of the principles of the invention. It is to be understood also that various other modifications and changes may be devised by those skilled in the art which will embody the principles of the invention and fall within the spirit and scope thereof. It is not desired to limit the invention to the exact construction and operation shown and described. The spirit and scope of this invention are limited only by the spirit and scope of the following claims.

What is claimed:

1. A method of making special locks available to travelers, comprising:
providing first and second special locks each comprising a master key lock portion that opens all said first and second special locks with the same master key, and indicia that are the same on all said first and second special locks and convey to a luggage screening authority that said same master key opens all said first and second special locks and to travelers that all said first and second special locks are recognized by the screening authority; and
including in each of said first and second special locks, in addition to said master key lock portion thereof, a traveler-operated lock portion, wherein:
the traveler-operated lock portion included in each of said first special locks is only one of the following three lock mechanisms: (i) a three-dial combination lock, (ii) a four-dial combination lock, and (iii) a lock mechanism other than a combination lock; and
the traveler-operated lock portion included in each of said second special locks also is only one of said three lock mechanisms (i), (ii), and (iii) but is not the one included in each of said first special locks; and wherein said same master key opens all said first and second special locks even though all said first special locks include one of said three lock mechanisms but all said second special locks include a different one of said three lock mechanisms.

2. The method of claim 1, further including the step of providing said luggage screening authority with multiple duplicates of said same master key.

3. The method of claim 1, in which said indicia include the symbol TSA.

4. The method of claim 1, in which said step of providing said first and second special locks comprises providing special locks that are padlocks.

5. The method of claim 1, including the step of supplying said first and second special locks to customers.

6. The method of claim 1, including the step of using said same master key to open said first and second special locks.

7. First and second special locks comprising:
   indicia other than a name of a manufacturer or a model designation, that are the same for each of said first and second special locks and convey to a luggage screening authority and to travelers that the authority opens the locks with a master key;
wherein:
   each of said first special locks includes one of the following three traveler-operated lock mechanisms: (i) a three-dial combination lock, (ii) a four-dial combination lock, and (iii) a lock mechanism other than a combination lock;
   each of said second special locks comprises one of said three traveler-operated lock mechanisms (i), (ii), and (iii) but not the one included in said first special locks; and
   said master key opens all said first and second locks despite their different traveler-operated lock mechanism.

8. The method of claim 1, further including the step of providing said master key to a division of the United States Department of Homeland Security and using said master key thereby to open said spatial locks.

9. First and second special locks comprising:
   a user-operated lock portion in each of said first special locks that comprises a plural-dial lock mechanism;
   a user-operated lock portion in each of said second special locks that comprises a lock mechanism other than a combination lock mechanism;
   a master key lock portion in each of said first and second special locks that opens all said first and second locks with the same master key; and
   indicia that are the same on each of said first and second special locks and convey to a luggage screening authority that all said first and second special locks open with the same master key despite the presence of a plural-dial user-operated lock mechanism in each said first special locks but a user-operated lock mechanism other than a plural-dial lock mechanism in each of said second special locks;
   wherein said special locks remain viable after being subjected to luggage screening and inspection that includes opening and re-locking the locks with said master key.

10. The special locks of claim 9, in which said indicia of each of the first and second special locks comprise the symbols TSA.

11. The special locks of claim 9, wherein said indicia are different from any model or manufacturer designation.

12. The special locks of claim 9, in which said first special locks include both (i) special locks in which the user-operated lock portion is a three-dial combination lock and (ii) special locks in which the user-operated portion is a four-dial combination lock.

13. The first and second special locks of claim 9, further including said master key and wherein said luggage screening authority is a division of the United States Department of Homeland Security.

14. The special locks of claim 7, in which said traveler-operated lock mechanism of each of said first special locks is a combination lock and said traveler-operated lock mechanism of each of said second special locks is a lock mechanism other than a combination lock.

15. The special locks of claim 7, in which said traveler-operated lock mechanism of each of said first special locks is a three-dial combination lock.

16. The special lock luggage locks of claim 7, in which said traveler-operated lock mechanism of each of said first special locks is a four-dial combination lock.

17. The special locks of claim 7, in which said luggage screening authority is the U.S. Transportation Security Administration.

18. The special locks of claim 7, in which the luggage screening authority is an entity authorized to open luggage of airline travelers.

19. The special locks of claim 7, in which the luggage screening authority is an entity authorized to screen luggage for security inspection.

20. The first and second special locks of claim 7, further including said master key and wherein said luggage screening authority is a division of the United States Department of Homeland Security.

21. A method of making special locks available to travelers, comprising
   providing a first special lock and a second special lock, wherein:
      the first special lock comprises (i) a first traveler-operated mechanism that opens the first special lock, (ii) a master key mechanism that opens the first special lock with a master key and (iii) indicia indicating to a luggage screening authority that the first special lock opens with said master key;
      the second special lock comprises (i) a second traveler-operated mechanism that opens the second special lock and is different in structure from the first traveler-operated mechanism, (ii) a master key mechanism that opens the second special lock also with said master key, and (iii) indicia indicating to the luggage screening authority that the second special lock also opens with said master key.

22. The method of claim 21, in which the first travel-operated mechanism is a plural-dial lock and the second travel operated mechanism is a lock that is other than a dial lock.

23. The method of claim 21, further including applying said special locks to luggage.

24. The method of claim 21, further including the step of using said master key to open one or more of said special locks.

25. The method of claim 21, further including the step of supplying duplicates of said master key to a luggage screening entity.

26. The method of claim 21, further including the step of supplying one or more duplicates of said master key to luggage or lock manufacturers.

27. The method of claim 21, further including providing said master key to a division of the United States Department of Homeland Security and using said master key thereby to open said spatial locks.

28. Special locks comprising
a first special lock and a second special lock, wherein:
the first special lock comprises (i) a first traveler-operated mechanism that opens the first special lock, (ii) a master key mechanism that opens the first special lock with a master key and (iii) indicia indicating to a luggage screening authority that the first special lock opens with said master key;
the second special lock comprises (i) a second traveler-operated mechanism that opens the second special lock and is different in structure from the first traveler-operated mechanism, (ii) a master key mechanism that opens the second special lock also with said master key, and (iii) indicia indicating to the luggage screening authority that the second special lock also opens with said master key.

29. The special locks of claim 28, in combination with said master key.

30. The special locks of claim 28, in which said luggage screening authority is a division of the United States Department of Homeland Security.

31. The special locks of claim 28, further including said master key and wherein said luggage screening authority is a division of the United States Department of Homeland Security.

\* \* \* \* \*